United States Patent [19]

Matthews

[11] 4,130,037

[45] Dec. 19, 1978

[54] SHEAR FOR CUTTING SHEET MATERIAL AND METHOD OF USE

[75] Inventor: Loren A. Matthews, Haslett, Mich.

[73] Assignee: Matt Tool Corporation, Haslett, Mich.

[21] Appl. No.: 807,449

[22] Filed: Jun. 17, 1977

[51] Int. Cl.² .............................................. B23D 23/00
[52] U.S. Cl. ..................................... 83/56; 83/467 R; 83/605; 83/607; 83/694
[58] Field of Search .................. 83/555, 580, 605–609, 83/694, 13, 56, 467

[56] References Cited

U.S. PATENT DOCUMENTS

| | | | |
|---|---|---|---|
| 2,219,602 | 10/1940 | Rayner | 83/694 X |
| 2,355,320 | 8/1944 | Nebel | 83/607 X |
| 3,393,595 | 7/1968 | Halverson et al. | 83/609 X |

FOREIGN PATENT DOCUMENTS

| | | | |
|---|---|---|---|
| 25123 | 11/1901 | Switzerland | 83/607 |

Primary Examiner—J. M. Meister
Attorney, Agent, or Firm—Ian C. McLeod

[57] ABSTRACT

A shear for cutting sheet material which functions by pivoting a specially constructed pointed blade about an axis by means of an arm so that the blade pierces into and then cuts the sheet is described as well as the method for its use. The blade is constructed such that it has double cutting edges forming a point wherein the cutting edge towards the pivot axis for the arm is concave and forms the point with the other cutting edge in a shape which approximates a shark's tooth. The blade pierces the sheet when the arm is pivoted towards the sheet and then cuts outward along a square edged surface on a frame supporting the arm away from the place where the sheet was pierced by the point. The shear is particularly adapted for the hand cutting of U shaped building channel to a predetermined length.

9 Claims, 3 Drawing Figures

SHEAR FOR CUTTING SHEET MATERIAL AND METHOD OF USE

BACKGROUND OF THE INVENTION

The present invention relates to a novel shear for cutting sheets wherein a specially constructed, shark's tooth shaped, pointed blade mounted on an arm which pivots on a frame supporting the sheet pierces the sheet and then cuts the sheet as the blade is moved in an arc and the method for its use. In particular, the present invention relates to a shear which is adapted to cutting building channel to a predetermined length.

PRIOR ART

The prior art contains numerous examples of shears for cutting a wide variety of sheet materials. One form of shear is a slightly curved saber-like or guillotine-like blade which is pivoted usually by means of an arm by hand in sliding contact with a square edge of a flat surface of a frame supporting the arm and blade in order to cut the sheet. The sheet is usually held in position on the flat surface with the hand for cutting. An example of this type of shear is a conventional paper cutter. This shear works well with easily cut materials.

Where sheets of metal are to be cut, the sheet is usually fixed in position by a retainer which prevents the sheet from moving and cut with a guillotine-like blade. With U shaped metal building channel, which has a backbone and two parallel sides, a retainer is provided which conforms to the outline or cross-section of the channel so that the blade does not bend and distort the channel as it is sheared. The retainer includes spaced apart parallel plates between which the blade slides. Usually such shears for metal cutting require compound leverage on the blade for cutting, which can be accomplished by means of a linkage rod between the arm and the blade. Such prior art channel shears are relatively expensive and even with the special retainer tend to deform the sides of the channel.

OBJECTS

It is therefore an object of the present invention to provide a shear which precisely cuts or shears metal and like sheet materials without the requirement of a conforming retainer for the sheet and to the method for its use. It is further an object of the present invention to provide a shear for cutting U shaped metal building channel without significantly deforming the sides. Further still it is an object of the present invention to provide a shear which is simple and economical to construct requiring only simple leverage on the blade for cutting. These and other objects will become increasingly apparent by reference to the following description and the drawing.

IN THE DRAWING

GENERAL DESCRIPTION

The present invention relates to an improvement in a shear for cutting a sheet of material wherein an arm mounting a blade is pivotable on an axis so that the blade moves in an arc adjacent to a square edged surface of a frame supporting the sheet for cutting the improvement which comprises: a blade having a point with double cutting edges one edge of which is concave closest to the pivot axis of the arm and forms the point with the other edge; and means for holding the sheet such that the blade at the point pierces the sheet when the arm supporting the blade is pivoted on the axis and then progressively cuts on both cutting edges in a line outward along the square edged surface of the frame away from where the sheet was pierced. In particular, the present invention relates to a shear wherein the sheet to be cut is in the form of a building channel which is U shaped with a backbone and tow parallel sides and wherein the frame supports the backbone in contact with the square edged surface of the frame and the sides of the channel such that the channel is pierced at about the center of the backbone by the blade which then cuts towards and through the sides as the blade is pivoted to cut the channel to a predetermined length. The blade is essentially shaped like a shark's tooth with the point curved towards the pivot.

The shear is most satisfactory for cutting sheet metal, particularly metal building channel, having a gauge between about 20 and 26 (0.35 and 0.016 inches) by hand with simple leverage. With powered and/or compound leverage, the tool will cut thicker gauge sheets. Usually the sheet must be at least thick enough to be self-supporting or it must be supported at the square edged surface of the frame.

SPECIFIC DESCRIPTION

Figure 1:
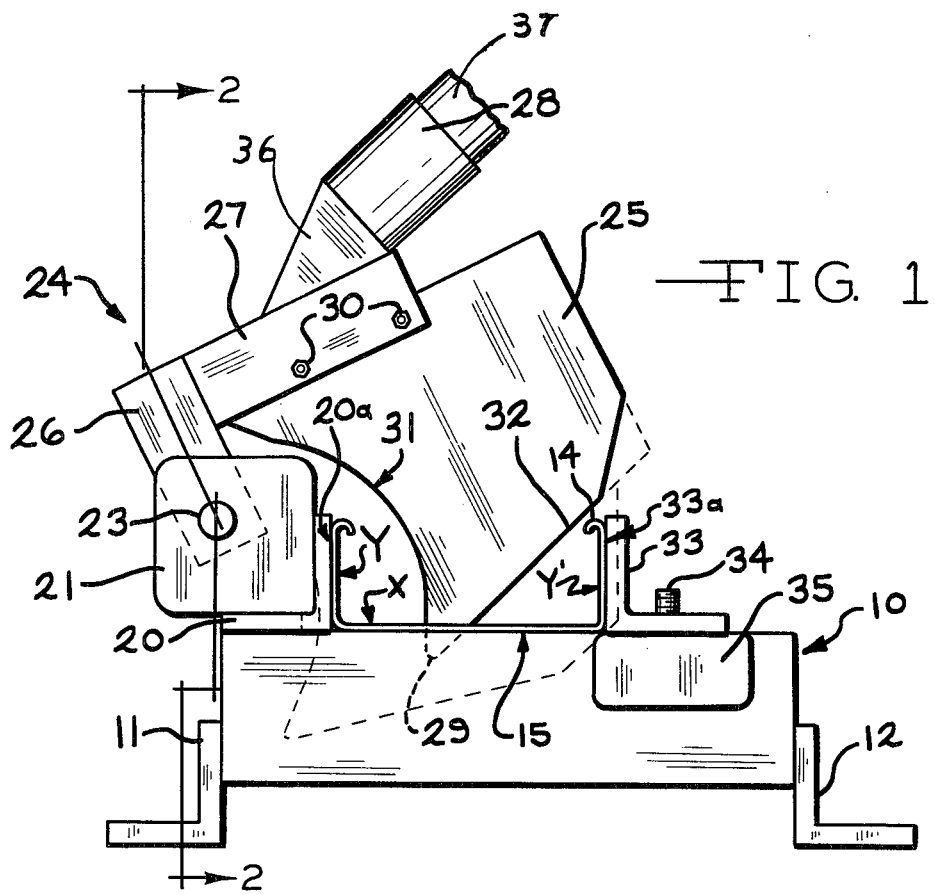
FIG. 1 is a front view of the shear of the present invention particularly illustrating the configuration and movement of a shark's tooth shaped blade and illustrating the positioning of a U shaped channel in holders on a frame.
Figure 2:
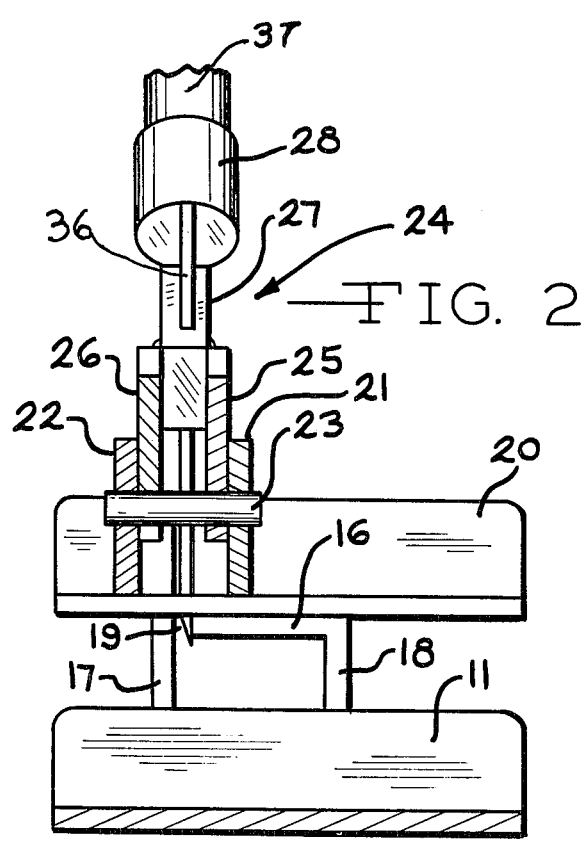
FIG. 2 is a cross-sectional end view of the shear shown in FIG. 1, along line 2—2, particularly illustrating the pivot pin for the arm and the slideable contact of the blade with an edge of a surface of the frame defined by a slot into which the blade is inserted.
Figure 3:
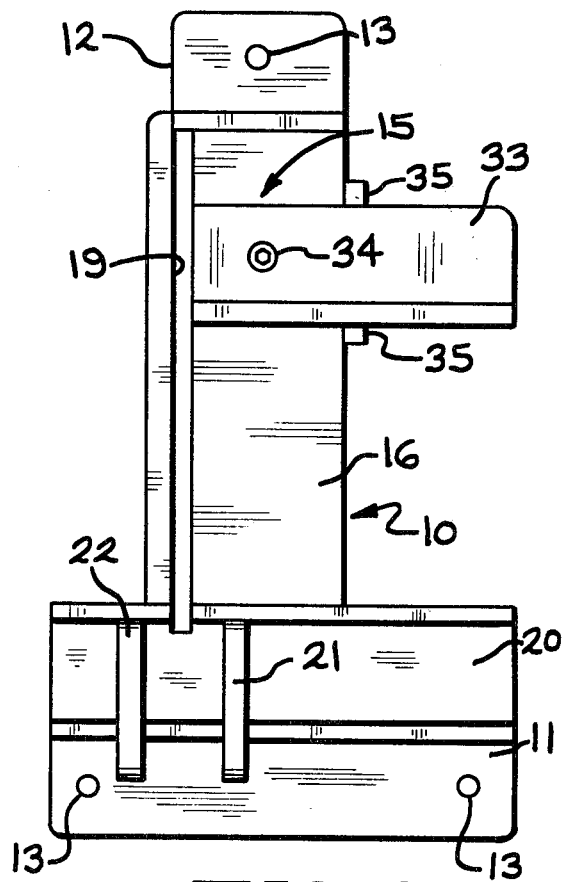
FIG. 3 is a plan view of the frame of the shear of FIG. 1 particularly illustrating the slot into which the blade is pivoted as well as illustrating the holders for the sides of the U shaped building channel.

Referring to FIGS. 1 to 3, a frame 10 is provided with right angle legs 11 and 12. As shown in FIG. 3, holes 13 are provided in the legs 11 and 12 for mounting the frame 10, preferably on a level plane. The frame 10 mounts a channel 14 to be cut on a supporting surface 15 at the backbone X of the channel 14. The surface 15 is formed by a flat plate 16 supported on bars 17 and 18 welded between a side of legs 11 and 12 on the side away from the inside 90° angle so that the holes 13 are positioned outward from the frame 10 for mounting of the legs 11 and 12. The bar 18 can be integral with the plate 16 such that is forms a right angle as shown in FIG. 1. The plate 16 and the bar 17 are spaced apart on the legs 11 and 12 so as to define a slot 19. At one end of the slot 19, a first right angle holder 20 is welded to the plate 16 such that a surface 20a of the holder 20 is at a 90° angle to the flat surface 15 of the plate 16 and to the slot 19. The holder 20 supports one side Y of the channel 14.

The holder 20 (on the inside of the 90° angle on the holder 20) mounts spaced apart parallel pivot plates 21 and 22 which support a pivot pin 23 defining an axis for pivot towards and away from the surface 15. Mounted on the pivot pin 23 is an arm 24 supporting a parallel sided blade 25. The arm 24 is dog-legged with a section 26 extending upward away from the surface 15 and from the pivot pin 23 and a section 27 extending outward at a 90° angle to the section 26 over the slot 19. Attached to the section 27 is a gusset 36 connected to a threaded collar 28 for mounting a pipe or handle 37 threaded into the collar 28 for levered downward and upward hand movement of the arm 24.

The blade 25 is attached to the section 27 by means of bolts and locking nuts 30 so that a point 29 of the blade 25 is extendable into about the center of the slot 19 as shown in FIG. 1. The blade 25 has a concave cutting edge 31 and a straight edge 32 which form the point 29 of the blade 25 such that the point 29 is hooked in the direction of the pivot pin 23. The point 29 pierces the channel 14 at about the center of the backbone X, as also shown in FIG. 1. The blade 25 thus has a shark's tooth shape. Preferably the cutting edges 31 and 32 are at one side of the blade 25 adjacent the slot 19 and is slideable in contact with the side. The dotted lines in FIG. 1 show the position of the blade 25 after it has cut the channel 14. At the point 29 there is preferably an angle of between about 30° to 70° between the concave edge 31 and the straight edge 32. A corner of the cutting edge 32 opposite the point 29 is removed (as shown in dotted lines) in order to avoid an extension of the blade 25 that might cut a hand in operation and to facilitate cutting of the channel 14.

A second 90° angle holder 33 is positioned parallel to the first holder 20 with the inside 90° angle facing away from the holder 20 for contacting a wall Y' of the channel 14 on surface 33a and can be adjustably fixed on the frame 10 to accomodate channels 14 of varying widths by means of an allen nut 34. Positioning bar 25 is mounted on the second holder 33 so that in use, the second holder 33 surface 33a will be parallel with the first holder 20 surface 20a along the walls Y and Y' of the channel 14.

In operation of the shear, the channel 14 is fitted between the holders 20 and 33 with the backbone X against the surface 15 of the plate 16. The holders 20 and 33 position the point 29 of the blade 25 approximately at the center of the backbone X of the channel 14. Hand pressure is applied to the handle 37 so that the point 29 pierces the channel 14. As additional pressure is applied on the handle 37, the channel 14 is cut and the blade 25 moves further into the slot 19. The concave edge 31 of the blade 25 moves towards the pivot pin 23 and then the straight edge 32 begins to cut the side Y' of the channel 14 away from the pivot pin 23. The opposite side Y of the channel 14 is then cut by the concave edge 31 starting at the top of the side wall Y. The result is that the channel 14 is cut to length without distortion of the backbone X or the sides Y or Y' in one rapid and easy stroke.

It will be appreciated that the blade of the present invention can have a variety of configurations similar to that shown in FIG. 1 so long as the cutting edge 31 is concavely curved to a point for piercing the sheet or channel towards the pivot pin 23 for the arm 24. All of the variations are within the scope of the present invention.

I claim:

1. A shear for cutting building channel which is U shaped with a backbone and two parallel sides to a predetermined length which comprises:
   (a) a frame having an elongate slot in a flat surface on the frame with a straight edged surface;
   (b) a pair of spaced apart parallel plates mounted adjacent to and perpendicular to the flat surface on the frame having holes in each plate defining a pivot axis towards the slot;
   (c) two spaced apart holders defining extensions of the straight edged surface and mounted on the frame so as to position a building channel with the backbone mounted on the flat surface over the slot and the sides against the holders so as to prevent the sides of the channel from being bent outward out of parallel;
   (d) a pivot arm moveable by hand to pivot over the slot mounted between the parallel plates by means of a pin in the holes in the plates; and
   (e) a blade with parallel sides and having a point formed by double cutting edges provided at one side of the blade which is in slideable contact with the straight edged surface of the slot which edges are at an angle of between about 30° to 70° to each other one of which nearest the pivot axis is concave, which blade is mounted and positioned on the pivot arm to be moveable into the slot adjacent the straight edged surface such that the backbone of the channel is pierced at about the center and cut towards the sides of the channel on both cutting edges as the blade is forced into the slot adjacent the straight edged surface on the frame and such that an edge of the blade opposite the concave edge first cuts into one side of the channel against one holder and then the concave edge of the blade cuts into the other side of the channel against the other holder and along the extensions of the straight edged surfaces on the holders until the channel is cut to length without significantly distorting the sides or backbone.

2. The shear of claim 1 wherein the cutting edge opposite the concave cutting edge is straight.

3. The shear of claim 1 wherein one of the holders is adjustable to contact the sides of channels of varying backbone spacings between the sides.

4. The shear of claim 1 wherein the cutting edges are formed at one parallel side of the blade.

5. The shear of claim 1 wherein the side of the blade is slideable in contact with a side of the elongate slot as the blade is pivoted into the slot and wherein the cutting edges are formed at the parallel side of the blade in contact with the slot.

6. In a shear for cutting a sheet of material which is U shaped with a backbone and two sides wherein an arm mounting a blade is pivotable on an axis so that the blade moves in an arc adjacent to a straight edged surface of a frame supporting the U shaped sheet for cutting, the improvement which comprises:
   (a) a blade having a point with double cutting edges provided at one side of the blade which is in slideable contact with the straight edged surface one edge of which is concave closest to the pivot axis of the arm and forms the point with the other edge and the edges are at an angle of about 30° to 70° to each other; and
   (b) spaced apart holders provided on the frame defining extensions of the straight edged surface which support the sides of the U shaped sheet to prevent the sides from being bent outward from each other, wherein the blade shape is such that the blade at the point pierces the U shaped sheet at the backbone when the arm supporting the blade is pivoted on the axis and then progressively cuts on both cutting edges in a line outward along the straight edged surface of the frame away from where the U shaped sheet was pierced and also cuts through the sides against the holders and along the extensions of the straight edged surfaces of the holders as the blade is pivoted to cut the U shaped sheet to a predetermined length without significantly distorting the sides or backbone of the U shaped sheet.

7. The shear of claim 6 wherein the U shaped sheet is in the form of a building channel with the backbone and two parallel sides and wherein the frame supports the backbone in contact with the straight edged surface of the frame and the sides of the channel such that the channel is pierced at about the center of the backbone by the blade which then is cut towards and through the sides as the blade is pivoted to cut the channel to a predetermined length.

8. The method of cutting a sheet of material which is U shaped with a backbone and two sides which comprises:
   (a) providing a blade which pivots in an arc on an axis adjacent to a sharp straight edged surface of a frame for supporting the backbone of the U shaped sheet and with spaced apart holders provided on the frame defining extensions of the straight edged surfaces which support the sides of the U shaped sheet from being bent outward from each other, wherein the blade is pointed with double cutting edges provided at one side of the blade which is in contact with the straight edge surface, one edge of which is concave closest to the pivot axis and forms the point with the other edge and the edges are at an angle of about 30° to 70° to each other;
   (b) positioning and holding a U shaped sheet to be cut on the frame at the straight edged surface; and
   (c) pivoting the blade so as to pierce the backbone of the U shaped sheet with the point and then progressively cut the U shaped sheet in a line along the straight edged surface on both cutting edges away from where the U shaped sheet was pierced and also to cut through the sides against the holders along the extensions of the straight edged surfaces of the holders as the blade is pivoted to cut the U shaped sheet to a predetermined length without significantly distorting the sides or the backbone of the U shaped sheet.

9. The method of claim 8 wherein the U shaped sheet is in the form of a building channel with the backbone and two parallel sides and wherein the channel is positioned such that the point of the blade pierces the backbone and then progresses through the sides of the channel along the straight edged surface until the channel is cut to a predetermined length.

* * * * *